United States Patent Office 2,822,380
Patented Feb. 4, 1958

2,822,380

Δ⁹⁽¹¹⁾-UNSATURATED D-HOMOSTEROIDS AND PROCESS

Raymond O. Clinton, North Greenbush, N. Y., assignor to Sterling Drug Inc., New York, N. Y., a corporation of Delaware No Drawing. Application January 14, 1954
Serial No. 404,123

6 Claims. (Cl. 260—488)

This invention relates to new tetracyclic compounds of the hydrochrysene series having the formula

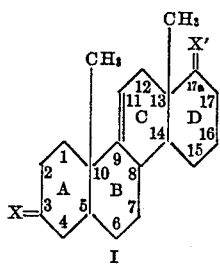

I wherein X and X' are selected from the class consisting of

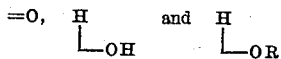

wherein R is a carboxylic acyl group. The invention also relates to a method for preparation of these new compounds.

My new compounds are prepared by dehydration of the corresponding compounds which are saturated in the 9(11)-position and contain an 11β-hydroxy group, said intermediates having the formula

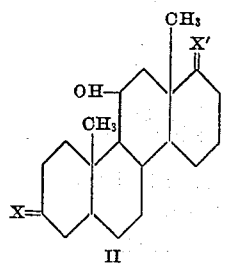

II wherein X and X' have the same meanings as given above. The intermediates of Formula II are prepared as described in my copending application, Serial No. 333,615, filed January 27, 1953, and now abandoned.

The dehydration of the compounds of Formula II is carried out by treating them with boron trifluoride, conveniently in the form of its ether complex, in acid medium. The acid medium is one in which the tetracyclic compound is soluble and which is inert to the action of boron trifluoride, such as a lower fatty acid; a preferred acid is acetic acid. The dehydration reaction takes place readily at room temperature.

In the above general Formula I, the groups X and X' each represent either a single divalent group, the oxygen portion of a carbonyl group (=O); or two monovalent groups, hydrogen and a hydroxy group or acyloxy group

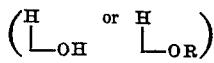

The groups X and X' can be the same or different, and when hydroxy or acyloxy groups are present they can be in either the α- or β-configuration. When X and X' are both

the acyl groups R can be the same or different.

The nature of the acyl groups is not critical as they are used only as blocking or protecting means for the hydroxy groups, and exert no influence upon any physiological properties inherent in the unesterified compounds. The preferred types of acyl groups are those derived from lower fatty acids, including lower-alkanoic acids, lower-aliphatic dicarboxylic acids and monocyclic aromatic carboxylic acids, optionally substituted by one or more inert groups such as nitro, alkyl, alkoxy and halogen. Thus R in the above definition can be lower-alkenoyl, such as formyl, acetyl, propionyl, butyryl, valeryl, isovaleryl, caproyl, etc., wherein the alkanoyl group has from 1 to about 6 carbon atoms; carboxy-lower-alkanoyl, such as succinyl, glutaryl and adipyl; and monocyclic aroyl, such as benzoyl, p-toluyl and p-nitrobenzoyl.

The compounds of Formula I can belong either to the normal series (A/B cis) or the allo series (A/B trans).

My new compounds are useful as intermediates in the preparation of compounds having hormonal properties, for example, 11-hydroxy-9-chloro compounds which are known in the steroid series to possess high cortisone-like activity. This transformation can be effected by reaction of the compounds of the invention with a peroxidic compound to give the 9(11)-epoxide, followed by cleavage with hydrogen chloride.

The following examples will further illustrate the invention.

EXAMPLE 1

9(11)-D-homoetiocholene-3α,17aβ-diol

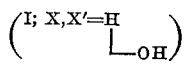

D-homoetiocholane-3α,11β,17aβ-triol (4.5 g.) was dissolved in 100 ml. of glacial acetic acid by gentle heating. The solution was cooled to room temperature, 5.0 ml. of boron trifluoride ether complex was added, and the mixture was allowed to stand at room temperature for nineteen hours. The mixture was then diluted with water and extracted with an ether-ethyl acetate mixture. The organic layer was separated, washed with water and concentrated to dryness. Ethanol was added to the residue and concentrated to dryness to remove residual ethyl acetate. The crystalline residue was taken up in 125 ml. of methanol, 6 g. of potassium carbonate in 25 ml. of water was added, and the mixture was refluxed for one and one-half hours in order to saponify any acetylated hydroxy groups produced during the reaction. Water was added to produce a total volume of one liter and the product was collected by filtration, washed with water and dried. The 3.6 g. of material thus obtained was recrystallized three times from ethyl acetate and dried for seven hours at 100° C. in a vacuum oven, given 9(11)-D-homoetiocholene-3α,17aβ-diol, M. P. 215–217.5° C. (corr.), [α]$_D^{25}$=+10.9° (1% in dioxane).

Analysis.—Calcd. for $C_{20}H_{32}O_2$: C, 78.89; H, 10.59. Found: C, 79.02; H, 10.60.

EXAMPLE 2

3α-acetoxy-9(11)-D-homoetiocholen-17a-one

A mixture of 4.00 g. of 3α-acetoxy-D-homoetiocholan-11β-ol-17a-one and 5 cc. of boron trifluoride ether complex and 25 cc. of glacial acetic acid was allowed to stand at room temperature for about sixteen hours. The reaction mixture was diluted with 75 cc. of water, and the solid which separated was collected by filtration and dried, giving 3.84 g. of 3α-acetoxy-9(11)-D-homoetiocholen-17a-one, M. P. 171–172° C. After three recrystallizations from ethyl acetate a sample melting at 177–179° C. (corr.) was obtained; $[\alpha]_D^{25} = +12.6°$ (1% in chloroform).

EXAMPLE 3

*9(11)-D-homoetiocholen-17aβ-ol-3-one*

$$\left( \text{I; X=O, X'=H} \atop \phantom{\text{I; X=O, X'=}}\text{—OH} \right)$$

can be prepared by treating D-homoetiocholane-11β,17aβ-diol-3-one with boron trifluoride ether complex in acetic acid according to the manipulative procedure described above in Example 1.

EXAMPLE 4

*3α-succinoxy-9(11)-D-homoetiocholen-17a-one*

$$\left( \text{I; X=H} \qquad , \text{X'=O} \atop \phantom{\text{I; X=}}\text{—OCOCH}_2\text{CH}_2\text{COOH} \right)$$

can be prepared by treating 3α-succinoxy-D-homoetiocholan-11β-ol-17a-one with boron trifluoride ether complex in acetic acid according to the manipulative procedure described above in Example 2.

EXAMPLE 5

*3α-benzoyloxy-9(11)-D-homoetiocholen-17a-one*

$$\left( \text{I; X=H} \qquad , \text{X'=O} \atop \phantom{\text{I; X=}}\text{—OCOC}_6\text{H}_5 \right)$$

can be prepared by treating 3α-benzoyloxy-D-homoetiocholan-11β-ol-17a-one with boron trifluoride ether complex in acetic acid according to the manipulative procedure described above in Example 2.

I claim:

1. A compound having the formula

[steroid structure with CH₃, CH₃, X', X= and 9(11) double bond]

wherein X and X' are selected from the class consisting of $$=O, \quad \overset{H}{\underset{\text{—OH}}{|}} \quad \text{and} \quad \overset{H}{\underset{\text{—OR}}{|}}$$

wherein R is a carboxylic acyl group having from 1 to about 8 carbon atoms.

2. A compound having the formula

[steroid structure with CH₃, CH₃, OH, HO—]

3. A compound having the formula

[steroid structure with CH₃, CH₃, O, HO—]

4. 9(11)-D-homoetiocholene-3α,17aβ-diol.
5. 3α-acetoxy-9(11)-D-homoetiocholen-17a-one.
6. The process for preparing a compound having the formula

[steroid structure with CH₃, CH₃, X', X=]

wherein X and X' are selected from the class consisting of $$=O, \quad \overset{H}{\underset{\text{—OH}}{|}} \quad \text{and} \quad \overset{H}{\underset{\text{—OR}}{|}}$$

wherein R is a carboxylic acyl group having from 1 to about 8 carbon atoms which comprises treating a compound having the formula

[steroid structure with CH₃, CH₃, X', OH—, X=]

in which the 11-hydroxy group is in the β-configuration with boron trifluoride in acid medium.

References Cited in the file of this patent

UNITED STATES PATENTS

| | | |
|---|---|---|
| 2,324,881 | Ruzicka et al. | July 20, 1943 |
| 2,351,637 | Ruzicka et al. | June 20, 1944 |

OTHER REFERENCES

Shoppee et al.: Chem. Abst. 38 (1944), 4615.
Jones et al.: J. Am. Chem. Soc. 73 (1951), 3216.